(12) United States Patent
Farrugia et al.

(10) Patent No.: US 9,243,141 B1
(45) Date of Patent: Jan. 26, 2016

(54) COATED SILVER NANOPARTICLE COMPOSITES COMPRISING A SULFONATED POLYESTER MATRIX AND METHODS OF MAKING THE SAME

(71) Applicant: XEROX CORPORATION, Norwalk, CT (US)

(72) Inventors: Valerie M. Farrugia, Oakville (CA); Alana Desouza, London (CA); Sandra J. Gardner, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/531,937

(22) Filed: Nov. 3, 2014

(51) Int. Cl.
| | |
|---|---|
| B32B 5/16 | (2006.01) |
| C08K 3/10 | (2006.01) |
| C08L 81/08 | (2006.01) |
| C08L 67/02 | (2006.01) |
| C08J 7/04 | (2006.01) |
| B82B 3/00 | (2006.01) |

(52) U.S. Cl.
CPC .............. *C08L 67/02* (2013.01); *C08J 7/047* (2013.01); *B32B 2255/26* (2013.01); *B32B 2264/105* (2013.01); *B82B 3/0009* (2013.01); *B82B 3/0095* (2013.01); *C08J 2367/02* (2013.01)

(58) Field of Classification Search
CPC ...... B82Y 30/00; B82Y 40/00; B82B 3/0009; B82B 3/0095; B32B 2255/26; B32B 2264/105; Y10T 428/2998
USPC ................................................ 428/403–407
See application file for complete search history.

(56) References Cited

U.S. PATENT DOCUMENTS

| | | | |
|---|---|---|---|
| 2003/0118664 A1* | 6/2003 | Trogolo et al. | 424/618 |
| 2007/0003603 A1* | 1/2007 | Karandikar et al. | 424/443 |
| 2007/0077510 A1* | 4/2007 | Nosella et al. | 430/109.4 |
| 2007/0265372 A1* | 11/2007 | Liu | 523/160 |
| 2010/0267885 A1* | 10/2010 | Harimoto | 524/500 |

OTHER PUBLICATIONS

Dallas et al., Silver polymeric nanocomposites as advanced antimicrobial agents: Classification, synthetic paths, applications, and perspectives, Advances in Colloid & Interface Science 166 (2011) 119-135.*
Lopez-Tobar, Eduardo, Stability of the Disulfide Bond in Cystine Adsorbed on Silver and Gold Nanoparticles as Evidenced by SERS Data, J. Phys. Chem. C2013, 117, 1531-1537.

(Continued)

*Primary Examiner* — Holly Le
(74) *Attorney, Agent, or Firm* — Pillsbury Winthrop Shaw Pittman LLP

(57) ABSTRACT

A composite structure includes a core particle including a sulfonated polyester matrix and a plurality of silver nanoparticles dispersed throughout the matrix and a shell polymer disposed about the core particle. A method includes heating a sulfonated polyester resin in an organic-free solvent adding a solution of silver (I) ion to the heated resin in water to form a mixture, forming of an emulsion of core particles comprising a sulfonated polyester matrix and a plurality of silver nanoparticles disposed within the sulfonated polyester matrix, and adding a styrene monomer and initiator to the emulsion of composite particles to form a shell polymer disposed about the core particles, thereby forming a composite structure. The composites herein are readily incorporated into various articles.

20 Claims, 6 Drawing Sheets

(56) References Cited

OTHER PUBLICATIONS

Sironmani, A. et al. (2011) Silver Nanoparticles-Universal Multifunctional Nanoparticles for Bio Sensing, Imaging for Diagnostic and Targeted Drug Delivery for Therapeutic Applications, Drug Delivery and Development—Present and Future, Dr. Izet Kapetanovic (Ed.), ISBN: 978-953-307-615-7, In Tech, http://www.intechopen.com/books/drug-discovery-and-development-present-and-future/silver-nanoparticles-universal-multifunctional-nanoparticles-for-bio-sensing-imaging-for-diagnostics.

Kneipp, K. et al. Surface-enhanced Raman scattering and biophysics, J. Phys.: Condens. Matter 14 (2002) R597-R624.

Lee, K et al., In Vivo Imaging of Transport and Biocompatibility of Single Silver Nanoparticles in Early Development of Zebrafish Embryos (Sep. 2007) ACS Nano, vol. 1, No. 2, 133-143.

Korbekandi, H. et al., (2012) Silver Nanoparticles, The Delivery of Nanoparticles, Dr. Abbass A. Hashim (Ed.), ISBN: 978-953-51-0615-9, InTech, http://www.intechopen.com/books/the-delivery-of-nanoparticles/silver-nanoparticles.

Rashid, M. et al. Synthesis of Silver Nano Particles (Ag-NPs) and their uses for Quantitative Analysis of Vitamin C Tablets, Dhaka Univ. J. Pharm. Sci. 12(1): 29-33, Jun. 2013.

Rivera, P. et al., Synthesis and characterization of silver nanoparticles for biosensor design, Universidad Interamericana de Puerto Rico—Recinto de Ponce, Revista 360° /No. Aug. 2013.

\* cited by examiner

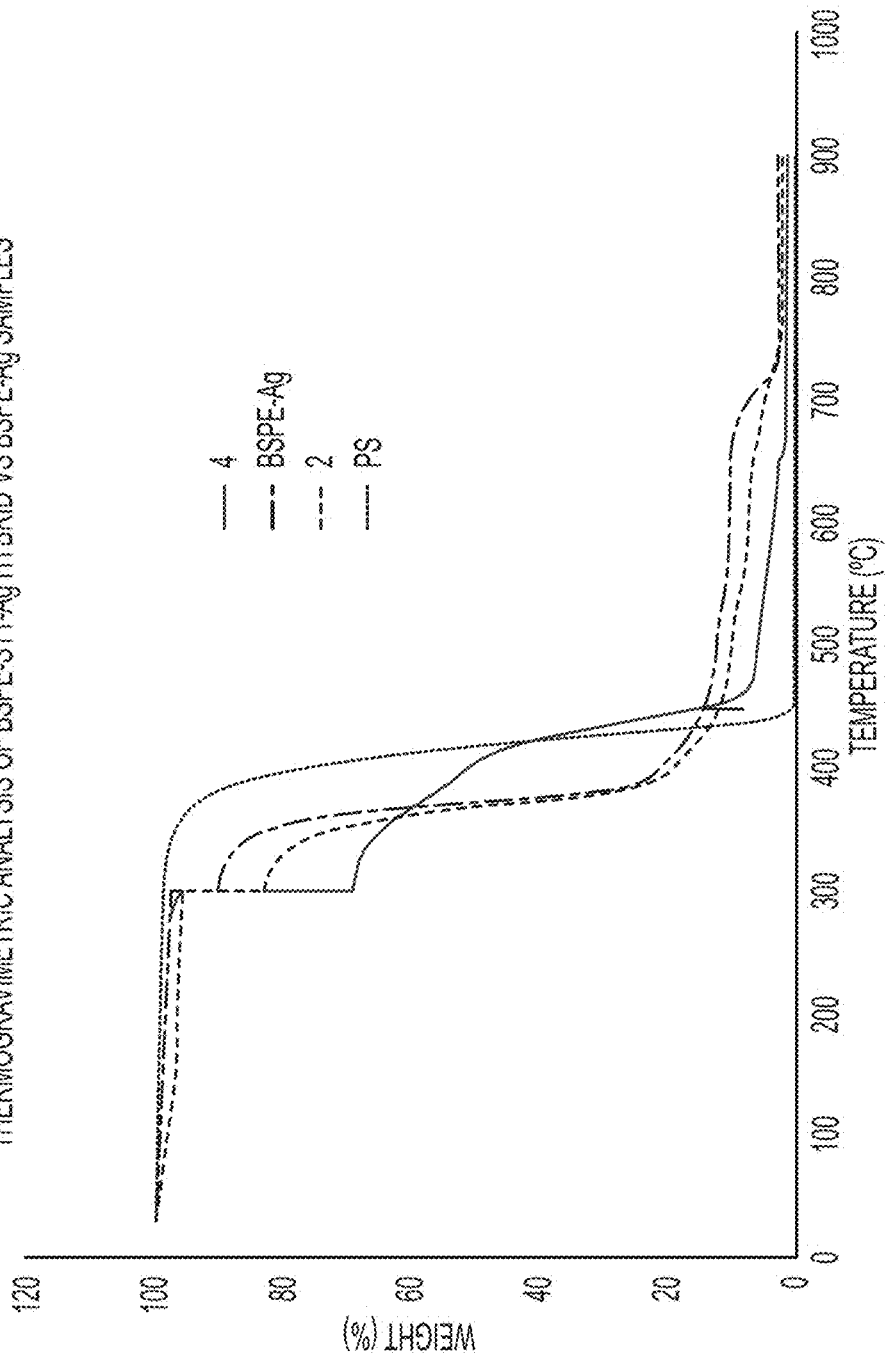

COATED SILVER NANOPARTICLE COMPOSITES COMPRISING A SULFONATED POLYESTER MATRIX AND METHODS OF MAKING THE SAME

BACKGROUND

The present disclosure relates to composites. More particularly, the present disclosure relates to composites of mixed organic-inorganic components.

There is an increasing interest in mixed inorganic/organic composite systems due to the property benefits each of the individual constituents confers on the composite material. One particular area of interest is silver nanoparticle (AgNP)-laden polymer composites. Such composites may be useful in antimicrobial applications, biosensor materials, composite fibers, cryogenic superconducting materials, cosmetic products, and electronic components. The unique properties of AgNPs, including size and shape-dependent optical, electrical, and magnetic properties, has resulted in increasing usage in consumer and medical products.

Many methods for the manufacture of metal/polymer nanostructured materials require pre-fabrication of metal nanoparticles by reduction of a metal salt precursor prior to incorporation into polymer matrices. For example, conventional methods for making silver/polymer nanostructured materials, in particular, generally require melt mixing or extrusion of silver nanoparticles (AgNPs) in polymer matrices. Unfortunately, these methods often suffer from silver nanoparticle aggregation.

SUMMARY

In some aspects, embodiments herein relate to composite structures comprising a core particle comprising a sulfonated polyester matrix and a plurality of silver nanoparticles dispersed throughout the matrix, the composite structure further comprising and a shell polymer disposed about the core particle.

In some aspects, embodiments herein relate to methods comprising heating a sulfonated polyester resin in an organic-free solvent, adding a solution of silver (I) ion to the heated resin in water to form a mixture, forming of an emulsion of core particles comprising a sulfonated polyester matrix and a plurality of silver nanoparticles disposed within the sulfonated polyester matrix, and adding a styrene monomer and initiator to the emulsion of composite particles to form a shell polymer disposed about the core particles, thereby forming a composite structure.

In some aspects, embodiments herein relate to articles comprising a plurality of composite structures comprising a core particle comprising a sulfonated polyester matrix and a plurality of silver nanoparticles dispersed throughout the matrix, the composite structures further comprising a shell polymer disposed about the core particle.

BRIEF DESCRIPTION OF DRAWINGS

Various embodiments of the present disclosure will be described herein below with reference to the figures wherein:

FIG. 7 shows a thermogravimetric analysis plot for coated and uncoated composite structures alongside controls for coating alone and sulfonated polystyrene matrix alone.

DETAILED DESCRIPTION

Figure 1:
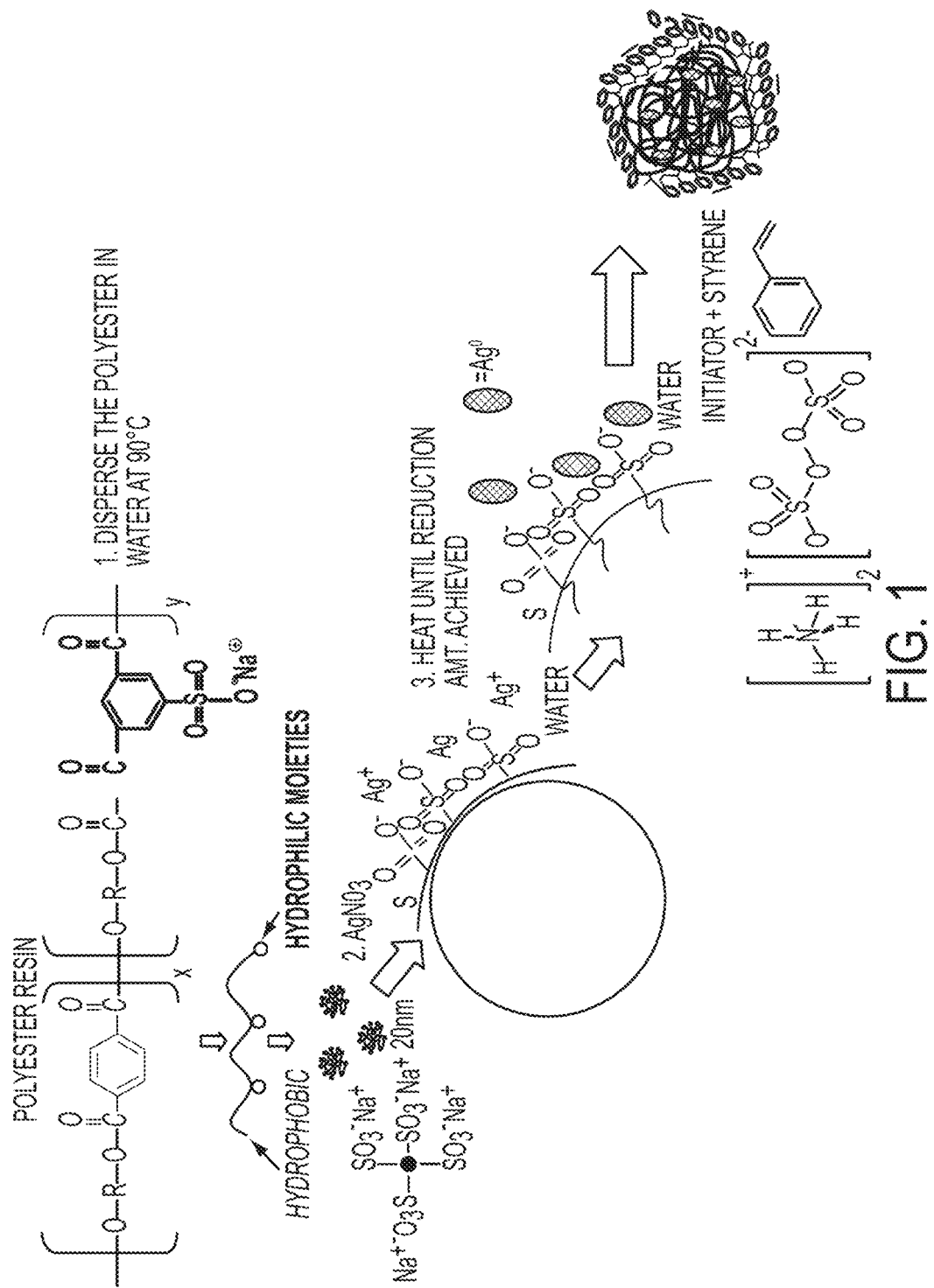
FIG. 1 shows a flow diagram for the production of polymer-coated, sulfonated polyester-silver nanoparticle (AgNP) composite structures in aqueous medium, in accordance with embodiments herein.

Embodiments herein relate to the preparation of sulfonated polyester-silver nanoparticle core particle composites coated with a protective polymer shell, such as polystyrene (PS). The protective polymer shell shields the core composite particle from various environmental stresses. The composite structures have an amphiphilic organic-inorganic composite core comprising reduced silver (i.e., Ag(0)) nanoparticles in sulfonated polyester matrices. The core particles are further coated with an organic polymer formed directly onto the core particles which act as a template for the shell.

The composite structures herein can take on the characteristics of the inorganic silver nanoparticles and the matrix and shell organic polymer elements to enhance mechanical performance and thermal stability to benefit downstream applications. In embodiments, the core particles which are useful even in the absence of the shell polymer may become susceptible to acid or base environments due to the lability of the ester linkages in the polyester. Such hydrolytic processes may be acid or base catalyzed. By providing a polymer shell around the core particle the rigidity and strength of the organic/inorganic hybrid composite can be improved.

The properties of the composite structures herein make them useful in various applications including, without limitation, electronics components, optical detectors, chemical and biochemical sensors and devices. The ability to miniaturize any of these materials is a major benefit of using the nanoscale composite structures herein. Other areas of interest that employ the composite structures herein include, without limitation, antibacterial applications, optical bi-stability, textiles photoresponsivity, environmental, biological, medicine (membranes and separation devices), functional smart coatings, fuel and solar cells, and as catalysts.

The composite structures herein can also be incorporated into organic/inorganic hybrid films with the ability to take on inorganic characteristics related to coating performance (robustness) and thermal stability. The composite structures provide antimicrobial properties due to the presence of the silver nanoparticles, which nanoparticles also provide excellent durability as well as high thermal stability. One exemplary application for films includes antibacterial coatings for steel surfaces, especially those related to hospital tools and equipment that can carry/spread harmful microorganisms. Another area in which these materials may be used is in paint and coatings technology. The composite structures herein can be used to improve the coating properties including, without limitation, adhesion, impact resistance, scratch hardness, gloss, and antimicrobial properties. Silver nanoparticles of less than about 100 nm are able to reinforce the sulfonated polyester matrix without disturbing the transparency and other properties of the coatings. Tsavalas, J. G., et al. J. Appl. Polym. Sci., 87:1825-1836 (2003).

The methods employed to prepare the composite structures herein are aqueous systems are thus environmentally sound and amenable to large scale materials/applications. The methods herein for the synthesis of the composite structures are also rapid and can be executed as a two-step, one-pot synthesis facilitating high yields. These and other advantages will be apparent to those skilled in the art.

The core particles making up the composite structures herein are fabricated from sulfonated polyester resins selected to have a hydrophobic backbone while presenting hydrophilic sulfonate groups attached along the chain. Without being bound by theory, when placed in water and heated, the hydrophobic portions may interact with each other to form a hydrophobic core with the hydrophilic sulfonate groups facing the surrounding water resulting in the sulfonated polyester self-assembling into a higher order, spherical nanoparticle without the requirement of additional reagents. Thus, there is a higher order involving the amphiphilic polyester, in which the hydrophobic backbone, which is insoluble in water, and the water-soluble hydrophilic sulfonate groups, operate as macrosurfactants. This results in self-association, self-assembly, self-dispersible nanoparticles in aqueous medium to yield micelle-like aggregates. The formation of silver nanoparticles within and surrounding the micelles is a secondary occurrence upon addition of silver nitrate and reducing agent.

In embodiments, there are provided composite structures comprising a core particle comprising a sulfonated polyester matrix and a plurality of silver nanoparticles dispersed throughout the matrix, the composite structure further comprising a shell polymer disposed about the core particle.

In embodiments, the sulfonated polyester matrix is a branched polymer. In embodiments, the sulfonated polyester matrix is a lithium, potassium, or sodium salt of a polymer selected from the group consisting of poly(1,2-propylene-5-sulfoisophthalate), poly(neopentylene-5-sulfoisophthalate), poly(diethylene-5-sulfoisophthalate), copoly-(1,2-propylene-5-sulfoisophthalate)-copoly-(1,2-propylene-terphthalate), copoly-(1,2-propylenediethylene-5-sulfoisophthalate)-copoly-(1,2-propylene-diethylene-terephthalatephthalate), copoly(ethylene-neopentylene-5-sulfoisophthalate)-copoly-(ethylene-neopentylene-terephthalatephthalate), and copoly(propoxylated bisphenol A)-copoly-(propoxylated bisphenol A-5-sulfoisophthalate).

Both linear amorphous and branched amorphous sulfonated polyester resins may be provided as alkali sulfonated polyester resins. The alkali metal in the respective sulfonated polyester resins may independently be lithium, sodium, or potassium. In embodiments, the sulfonated polyester matrix is selected from the group consisting of poly(1,2-propylene-5-sulfoisphthalate), poly(neopentylene-5-sulfoisophthalate), poly(diethylene-5-sulfoisophthalate), copoly-(1,2-propylene-5-sulfoisophthalate)-copoly-(1,2-propylene-terphthalate), copoly-(1,2-propylenediethylene-5-sulfoisophthalate)-copoly-(1,2-propylene-diethylene-terephthalatephthalate), copoly(ethylene-neopentylene-5-sulfoisophthalate)-copoly-(ethylene-neopentylene-terephthalatephthalate), and copoly(propoxylated bisphenol A)-copoly-(propoxylated bisphenol A-5-sulfoisophthalate).

In general, the sulfonated polyesters may have the following general structure, or random copolymers thereof in which the n and p segments are separated.

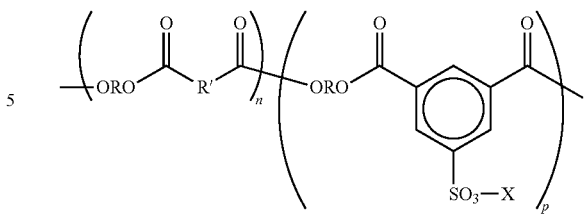

wherein R is an alkylene of, for example, from 2 to about 25 carbon atoms such as ethylene, propylene, butylene, oxyalkylene diethyleneoxide, and the like; R' is an arylene of, for example, from about 6 to about 36 carbon atoms, such as a benzylene, bisphenylene, bis(alkyloxy)bisphenolene, and the like; and p and n represent the number of randomly repeating segments, such as for example from about 10 to about 100,000.

Examples further include those disclosed in U.S. Pat. No. 7,312,011 which is incorporated herein by reference in its entirety. Specific examples of amorphous alkali sulfonated polyester based resins include, but are not limited to, copoly(ethylene-terephthalate)-copoly-(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfo-isophthalate), copoly(propylene-butylene-terephthalate)-copoly(propylene-butylene-5-sulfo-isophthalate), copoly(propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), and copoly(ethoxylated bisphenol-A-maleate)-copoly(ethoxylated bisphenol-A-5-sulfo-isophthalate), and wherein the alkali metal is, for example, a sodium, lithium or potassium ion. Examples of crystalline alkali sulfonated polyester based resins alkali copoly(5-sulfoisophthaloyl)-co-poly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), and alkali copoly(5-sulfo-iosphthalbyl)-copoly(octylene-adipate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-co-poly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfoisophthaloyl)-copoly(ethylene-succinate), alkali copoly(5-sulfoisophthaloyl-copoly(butylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-iosphthaloyl)-copoly(butylene-adipate), alkali copoly(5-sulfo-isophthaloyl)-copoly(pentylene-adipate), alkali copoly(5-sulfo-isophthaloyl)copoly(hexylene-adipate), poly(octylene-adipate), and wherein the alkali is a metal like sodium, lithium or potassium. In embodiments, the alkali metal is lithium.

The linear amorphous polyester resins are generally prepared by the polycondensation of an organic diol and a diacid or diester, at least one of which is sulfonated or a sulfonated difunctional monomer being included in the reaction, and a polycondensation catalyst. For the branched amorphous sulfonated polyester resin, the same materials may be used, with the further inclusion of a branching agent such as a multivalent polyacid or polyol.

Examples of diacid or diesters selected for the preparation of amorphous polyesters include dicarboxylic acids or diesters selected from the group consisting of terephthalic acid, phthalic acid, isophthalic acid, fumaric acid, maleic acid, itaconic acid, succinic acid, succinic anhydride, dodecylsuccinic acid, dodecylsuccinic anhydride, glutaric acid, glutaric anhydride, adipic acid, pimelic acid, suberic acid, azelic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures thereof.

The organic diacid or diester may comprise about 45 to about 52 mole percent of the resin. Examples of diols utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hyroxyethyl)-bisphenol A, bis(2-hyroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, and mixtures thereof. The amount of organic diol selected can vary, and more specifically, is, for example, from about 45 to about 52 mole percent of the resin.

Alkali sulfonated difunctional monomer examples, wherein the alkali is lithium, sodium, or potassium, include dimethyl-5-sulfo-isophthalate, dialkyl-5-sulfo-isophthalate-4-sulfo-1,8-naphthalic anhydride, 4-sulfo-phthalic acid, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, dialkyl-sulfo-terephthalate, sulfo-ethanediol, 2-sulfo-propanediol, 2-sulfo-butanediol, 3-sulfo-pentanediol, 2-sulfo-hexanediol, 3-sulfo-2-methylpentanediol, N,N-bis(2-hydroxyethyl)-2-aminoethane sulfonate, 2-sulfo-3,3-dimethylpent-anediol, sulfo-p-hydroxybenzoic acid, mixtures thereto, and the like. Effective difunctional monomer amounts of, for example, from about 0.1 to about 2 weight percent of the resin can be selected.

Branching agents for use in forming the branched amorphous sulfonated polyester include, for example, a multivalent polyacid such as 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane, and 1,2,7,8-octanetetracarboxylic acid, acid anhydrides thereof, and lower alkyl esters thereof, 1 to about 6 carbon atoms; a multivalent polyol such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxymethylbenzene, mixtures thereof, and the like. The branching agent amount selected is, for example, from about 0.1 to about 5 mole percent of the resin.

Polycondensation catalyst examples for amorphous polyesters include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof; and which catalysts are selected in amounts of, for example, from about 0.01 mole percent to about 5 mole percent based on the starting diacid or diester used to generate the polyester resin.

In particular embodiments, the sulfonated polyester matrix comprises a polyol monomer unit selected from the group consisting of trimethylolpropane, 1,2-propanediol, diethylene glycol, and combinations thereof.

In particular embodiments, the sulfonated polyester matrix comprises a diacid monomer unit selected from the group consisting of terephthalic acid, sulfonated isophthalic acid, and combinations thereof.

In embodiments, the core particle may have a particle size in a range from about 5 nm to about 500 nm, or about 10 to about 200 nm, or about 20 to about 100 nm. A core particle size of less than 100 nm may be useful for reinforcement of polymer matrices without disturbing transparency and other properties of coatings. Tsavalas, J. G. et al. J. Appl. Polym. Sci., 87:1825-1836 (2003).

In embodiments, a loading of silver is present in the composite is in a range from about 100 ppm to about 10,000 ppm. Loading concentrations of silver within this range can be used for antibacterial applications. Lower concentrations of silver might be sufficient for catalytic applications; concentrations of AgNPs as low as 1 ppm have been used. Ghosh, S. K. et al. Langmuir. 18(23):8756-8760 (2002). In embodiments, silver nanoparticle loading may be about 200 ppm (0.02%) to about 5000 ppm (0.5%) or from about 500 ppm (0.05%) to about 1000 ppm (0.1%). Those skilled in the art will appreciate the target loading will be selected depending on the anticipated downstream application selected for the material.

In embodiments, the silver nanoparticles have a particle size in a range from about 2 to about 50 nm, or about 10 to about 50 nm or about 20 to about 50 nm. Silver nanoparticles of diameter less than 100 nm absorb light primarily below 500 nm. This property is useful as it allows the AgNPs to be used in combination with fluorescence emission detection since most fluorophores emit at a wavelength above 500 nm, thus minimizing quenching of the signal.

In embodiments, the core particles may comprise further nanostructured materials, such as, without limitation, carbon nanotubes (CNTs, including single-walled, double-walled, and multi-walled), graphene sheet, nanoribbons, nano-onions, hollow nanoshell metals, nano-wires and the like. In embodiments, CNTs may be added in amounts that enhance electrical and thermal conductivity.

In embodiments, the shell polymer disposed about the core particle comprises a styrene monomer, including substituted or unsubstituted styrenes. In embodiments, the shell polymer further comprises at least one vinyl monomer selected from the group consisting of methyl acrylate, ethyl acrylate, butyl acrylate, isobutyl acrylate, dodecyl acrylate, n-octyl acrylate, 2-ethylhexyl acrylate, 2-chloroethyl acrylate, phenyl acrylate, β-carboxyethyl acrylate, methyl α-chloro acrylate, methyl methacrylate, ethyl methacrylate, butyl methacrylate, butadiene, isoprene, methacrylonitrile, acrylonitrile, methyl vinyl ether, vinyl isobutyl ether, vinyl ethyl ether, vinyl acetate, vinyl propionate, vinyl benzoate, vinyl butyrate, vinyl methyl ketone, vinyl hexyl ketone, and methyl isopropenyl ketone, vinylidene chloride, vinylidene chloro fluoride, N-vinylindole, N-vinyl pyrrolidene, acrylic acid, methacrylic acid, acrylamide, methacrylamide, vinyl pyridine, vinyl pyrrolidone, vinyl N-methylpyridinium chloride, vinyl naphthalene, p-chlorostyrene, vinyl chloride, vinyl fluoride, ethylene, propylene, butylene, and isobutylene.

In embodiments, the shell polymer has a thickness from about 0.5 nm to about 100 nm, or from about 1.0 nm to about 50 nm, or from about 1.5 nm to about 20 nm.

In embodiments, the shell polymer confers to the core particle one or more properties selected from the group consisting of (a) methanol resistance, (b) resistance to thermal degradation, and (c) acid/base resistance. With respect to methanol resistance, it is postulated that the polymer shell protects the core sulfonated polyester/AgNP composite from gelation. In embodiments, no more than about 10% material dissolves when, for example, a styrene shell is used.

With respect to resistance to thermal degradation, polymer shell-protected composites show only about 50% degradation at 400° C., while uncoated SPE-AgNP composites show about 80% decomposition at 400° C. The thermal stability of the styrene-coated composites, in particular, appears to be more complex than that of polystyrene alone. The first major mass loss of the styrene-coated composites starts around 300° C. (30.65%) but becomes more stable and degrades much slower than uncoated samples and polystyrene control.

With respect to acid/base resistance, addition of a polymer shell, such as styrene, to the core composite may provide an improvement under basic conditions by 20 to 30%. Finally, a polymer shell, such as polystyrene, around the SPE/AgNp core provides substantially improved rigidity and strength of the organic/inorganic hybrid composite core materials.

In embodiments, there are provided methods for assembling the composite structures herein, the method comprising heating a sulfonated polyester resin in an organic-free solvent adding a solution of silver (I) ion to the heated resin in water to form a mixture, forming of an emulsion of core particles comprising a sulfonated polyester matrix and a plurality of silver nanoparticles disposed within the sulfonated polyester matrix and adding a styrene monomer and initiator to the emulsion of composite particles, thereby forming a shell polymer disposed about the core particles thereby forming a composite structure.

In embodiments, forming the emulsion comprises continued heating after adding the solution of silver (I) ion to the heated resin in water. In some such embodiments, the reducing agent is selected from ascorbic acid, trisodium citrate. In other embodiments, forming the emulsion comprises adding a reducing agent after adding the solution of silver (I) ion to the heated resin in water. In embodiments, heating is conducted at a temperature from about 65° C. to about 90° C. Temperatures in this range are appropriate for both the initial dissolution of the polymer resin and subsequent reduction in the presence of silver ion.

In embodiments, a source of silver (I) ion is selected from silver nitrate, silver sulfonate, silver fluoride, silver perchlorate, silver lactate, silver tetrafluoroborate, silver oxide and silver acetate.

In embodiments, methods may include during addition of styrene monomer, also adding at least one vinyl monomer selected from the group consisting of methyl acrylate, ethyl acrylate, butyl acrylate, isobutyl acrylate, dodecyl acrylate, n-octyl acrylate, 2-ethylhexyl acrylate, 2-chloroethyl acrylate, phenyl acrylate, β-carboxyethyl acrylate, methyl α-chloro acrylate, methyl methacrylate, ethyl methacrylate, butyl methacrylate, butadiene, isoprene, methacrylonitrile, acrylonitrile, methyl vinyl ether, vinyl isobutyl ether, vinyl ethyl ether, vinyl acetate, vinyl propionate, vinyl benzoate, vinyl butyrate, vinyl methyl ketone, vinyl hexyl ketone, and methyl isopropenyl ketone, vinylidene chloride, vinylidene chloro fluoride, N-vinylindole, N-vinyl pyrrolidene, acrylic acid, methacrylic acid, acrylamide, methacrylamide, vinyl pyridine, vinyl pyrrolidone, vinyl N-methylpyridinium chloride, vinyl naphthalene, p-chlorostyrene, vinyl chloride, vinyl fluoride, ethylene, propylene, butylene, and isobutylene.

In embodiments, there are provided articles comprising a plurality of composite structures as described herein, the composite structures may comprise a core particle comprising a sulfonated polyester matrix and a plurality of silver nanoparticles dispersed throughout the matrix and a shell polymer disposed about the core particle. Articles may include an agglomeration of the composite structures, incorporation in thin films on other objects, or the like.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

General process: sulfonated polyester polymer self-assembles in water from about 65° C. to about 90° C. whereby it has been postulated that the hydrophobic backbone forms the core of the sphere, while the hydrophilic sulfonate functional groups are oriented to face the surrounding water. Silver is then added and the electrostatic attraction between the sulfonate groups and the $Ag^+$ ions provides association between the silver and the polymer matrix. A reducing agent can be added to facilitate the reduction of $Ag^+$ to $Ag(0)$ on the surface of sulfonated polyester, although it has been shown that continued heating allows reduction even in the absence of an external reducing agent. Furthermore, the where branched sulfonated polyesters are employed, the polymer is particularly suited to create a porous structure that allows for diffusion of materials through it. When a hydrophobic monomer, such as styrene, is added it can polymerize about the hydrophobic core particle with some diffusion within the porous core. The sulfonated polyester may serve as a stabilizer for in-situ synthesized AgNPs and as a nano-template provide a favorable environment for the polymerization of styrene in water without the use of a surfactant.

Example 1

This example describes the preparation of a branched sodio sulfonated amorphous polyesters (BSPE-1)) which can be used as a matrix for core particles of the composite structures herein.

A branched amorphous sulfonated polyester resin comprised of 0.425 mole equivalent of terephthalate, 0.080 mole equivalent of sodium 5-sulfoisophthalic acid, 0.4501 mole equivalent of 1,2-propanediol, and 0.050 mole equivalent of diethylene glycol, was prepared as follows. In a one-liter Parr reactor equipped with a heated bottom drain valve, high viscosity double turbine agitator, and distillation receiver with a cold water condenser was charged 388 grams of dimethylterephthalate, 104.6 grams of sodium 5-sulfoisophthalic acid, 322.6 grams of 1,2-propanediol (1 mole excess of glycols), 48.98 grams of diethylene glycol, (1 mole excess of glycols), trimethylolpropane (5 grams) and 0.8 grams of butyltin hydroxide oxide as the catalyst. The reactor was heated to 165° C. with stirring for 3 hours and then again heated to 190° C. over a one hour period, after which the pressure was slowly reduced from atmospheric pressure to about 260 Torr over a one hour period, and then reduced to 5 Torr over a two hour period. The pressure was then further reduced to about 1 Torr over a 30 minute period and the polymer was discharged through the bottom drain onto a container cooled with dry ice to yield 460 grams of sulfonated-polyester resin. The branched sulfonated-polyester resin had a glass transition temperature measured to be 54.5° C. (onset) and a softening point of 154° C.

Example 2

This example describes the preparation of a BSPE core particle with no silver or styrene shell.

The reaction was carried out in a 3 necked, 500 mL round bottom flask equipped with an overhead stirrer, reflux condenser, thermocouple, hot plate, and nitrogen entrance (the condenser acted as the nitrogen exit). 125 mL of deionized water was charged into flask at room temperature (22° C.). The water was heated to 90° C. with stirring while nitrogen running through the solution (RPM=330). Then 50.0 g of finely ground, solid BSPE-1 was added to the DIW (RPM=400). The solution was stirred at 90° C. for 2 hours (RPM=400). Then the BSPE emulsion was cooled to room temperature with stirring (RPM=400). The final appearance was a white, opaque solution.

Example 3

This example describes the formation of a styrene shell about a BSPE core particle with no silver dispersed within the core particle.

The reaction was carried out in a 3 necked, 500 mL round bottom flask equipped with an overhead stirrer, reflux condenser, thermocouple, hot plate, and nitrogen entrance (the condenser acted as the nitrogen exit). 240 mL of distilled water was charged into the flask at room temperature (22° C.). The heat was turned on and set to 90° C. and nitrogen was run through the system for 30 minutes (RPM=300). Once the temperature had stabilized, 50.0 g of finely ground BSPE-1 was added to the flask (RPM=300). The solution was translucent with a blue tinge. The mixture was left to stir for 2 hours. Then the set point was reduced to 75° C. Once the temperature had stabilized, 3.6 g styrene (9% of total monomer) was added. Following this, 0.08 g ammonium persulfate (initiator) dissolved in 10 mL distilled water was added dropwise. Ammonium persulfate causes a slight increase in temperature (exotherm). After the temperature had stabilized at 75° C., 36.40 g styrene monomer was added dropwise over 15 minutes. The solution was white and opaque after monomer addition was complete. The reaction then ran for 2 hours at 75° C. The solution was then allowed to cool to room temperature. The final appearance was a white, opaque solution.

Example 4

This example describes the formation of a styrene shell about a BSPE/AgNP core composite prepared in the absence of a reducing agent.

The reaction was carried out in a 3 necked, 500 mL round bottom flask equipped with an overhead stirrer, reflux condenser, thermocouple, hot plate, and nitrogen entrance (the condenser acted as the nitrogen exit). 235 mL of distilled water was charged into the flask at room temperature (22° C.). The heat was turned on and set to 90° C. and nitrogen was run through the system for 30 minutes (RPM=300). Once the temperature had stabilized, 50.0 g of finely ground BSPE-1 was added to the flask (RPM=330). The solution was translucent with a blue tinge. The mixture was left to stir for 2 hours. 0.12 g of AgNO$_3$ was dissolved in 10 mL distilled water and added to the solution dropwise (1 drop/second). A colour change to dark brown with a yellow tinge was observed. After the completion of AgNO$_3$ addition, the set point was reduced to 75° C. Once the temperature had stabilized, 3.6 g styrene (9% of total monomer) was added. Following this, 0.08 g ammonium persulfate (initiator) dissolved in 5 mL distilled water was added dropwise. Ammonium persulfate causes a slight increase in temperature (exotherm). After the temperature had stabilized at 75° C., 36.40 g styrene monomer was added dropwise over 40 minutes. The solution was light pink and opaque after monomer addition was complete. The reaction then ran for 2 hours at 75° C. The solution was then allowed to cool to room temperature. The final appearance was a light pink, opaque solution.

Example 5

This example describes the formation of a styrene shell about a BSPE/AgNP core particle prepared in the presence of the reducing agent oleic acid.

The reaction was carried out in a 3 necked, 500 mL round bottom flask equipped with an overhead stirrer, reflux condenser, thermocouple, hot plate, and nitrogen entrance (the condenser acted as the nitrogen exit). 118 mL of distilled water and 0.2500 g oleic acid were charged into the flask at room temperature (22° C.). The heat was turned on and set to 90° C. and nitrogen was run through the system for 30 minutes (RPM=300). Once the temperature had stabilized, 25.0 g of finely ground BSPE-1 was added to the flask (RPM=250). The solution was translucent and purple/brown in colour. The mixture was left to stir for 2 hours. 0.12 g of AgNO$_3$ was dissolved in 5 mL distilled water and added to the solution dropwise (1 drop/second). A colour change to dark brown was observed. After the completion of AgNO$_3$ addition, the set point was reduced to 75° C. (RPM=330). Once the temperature had stabilized, 20.0 g of styrene was added. Following this, 0.05 g ammonium persulfate (initiator) dissolved in 2 mL distilled water was added dropwise. The reaction was run for 4 hours at 75° C., then for 16.5 hrs. at 60° C. (RPM=330). The solution was then allowed to cool to room temperature. The final appearance was a brown opaque solution.

Example 6

This example describes the formation of a styrene shell about a BSPE/AgNP core particle prepared in the presence of the reducing agent glutathione.

The reaction was carried out in a 3 necked, 500 mL round bottom flask equipped with an overhead stirrer, reflux condenser, thermocouple, hot plate, and nitrogen entrance (the condenser acted as the nitrogen exit). 240 mL of distilled water was charged into the flask at room temperature (22° C.). The heat was turned on and set to 90° C. and nitrogen was run through the system for 30 minutes (RPM=300). Once the temperature had stabilized, 35.0 g of finely ground BSPE-1 was added to the flask. The solution was opaque and white with a blue tinge. The BSPE was mixed for 1 hour to disperse it. 0.12 g of $AgNO_3$ was dissolved in 5 mL distilled water and added to the solution dropwise (1 drop/second). A color change to brown was observed. After the completion of $AgNO_3$ addition, the set point was reduced to 75° C. Once the temperature had stabilized, 0.0353 g of glutathione (reducing/stabilizing agent) was added. The solution became dark brown. Following this, 3.27 g styrene (8% of total monomer) was added (RPM=390). Then 0.1 g potassium persulfate (initiator) dissolved in 5 mL distilled water was added dropwise. A color change to purple was observed. After 5 minutes, 36.73 g of styrene monomer was added dropwise over 40 minutes. The solution was pale purple after the completion of monomer addition. The reaction was run for 4 hours at 75° C. (RPM=390). The solution was then allowed to cool to room temperature. The final appearance was a grey, opaque solution.

Table 1 shows particle characterization for coated and uncoated core particles comprising sulfonated polyester silver nanoparticles with or without silver nanoparticles.

TABLE 1

| | Reducing Agent | % Styrene relative to BSPE | Theoretical % Solids | Loading [$AgNO_3$] (M) | Loading [$AgNO_3$] (w/w %) | Actual % Solids | Particle Size D50 (nm) | Zeta Potential (mV) |
|---|---|---|---|---|---|---|---|---|
| Ex. 4 | none | 44 | 26.51% | 2.08E−03 | 0.04% | 26.57% | 31.3 | −61.8 |
| Ex. 5 | oleic acid | 44 | 26.65% | 4.87E−03 | 0.07% | 22.88% | 34.3 | −65.9 |
| Ex. 6 | glutathione | 53 | 23.14% | 2.44E−03 | 0.04% | 22.00% | 47.3 | −59.0 |
| Ex. 2 | none | 0 | 28.57% | 0 | 0.00% | 29.46% | 31.8 | −58.9 |
| Ex. 3 | none | 44 | 26.49% | 0 | 0.00% | 26.54% | 30.1 | −60.1 |

Table 1 shows the particle size and zeta potential of all samples to be comparable except for a couple of outliers. Example 5 has a higher zeta potential compared to the other samples, which may be due to the contribution of the carboxyl groups from oleic acid which slightly increases the negative surface charge of the nanoparticles. Example 6 contains a higher loading of styrene and glutathione both of which may contribute to the higher particle size compared to the other samples.

Table 2 shows Gel Permeation Chromatography (GPC) of Styrenated BSPE AgNPs as full spectrum and spliced for styrene and BSPE portion.

crosslinking of the polystyrene which failed to melt. When higher temperatures were applied to these samples they began to char and decompose. The thermal properties of the styrenated BSPE with AgNPs are much more robust than BSPE/AgNPs alone.

Figure 3:
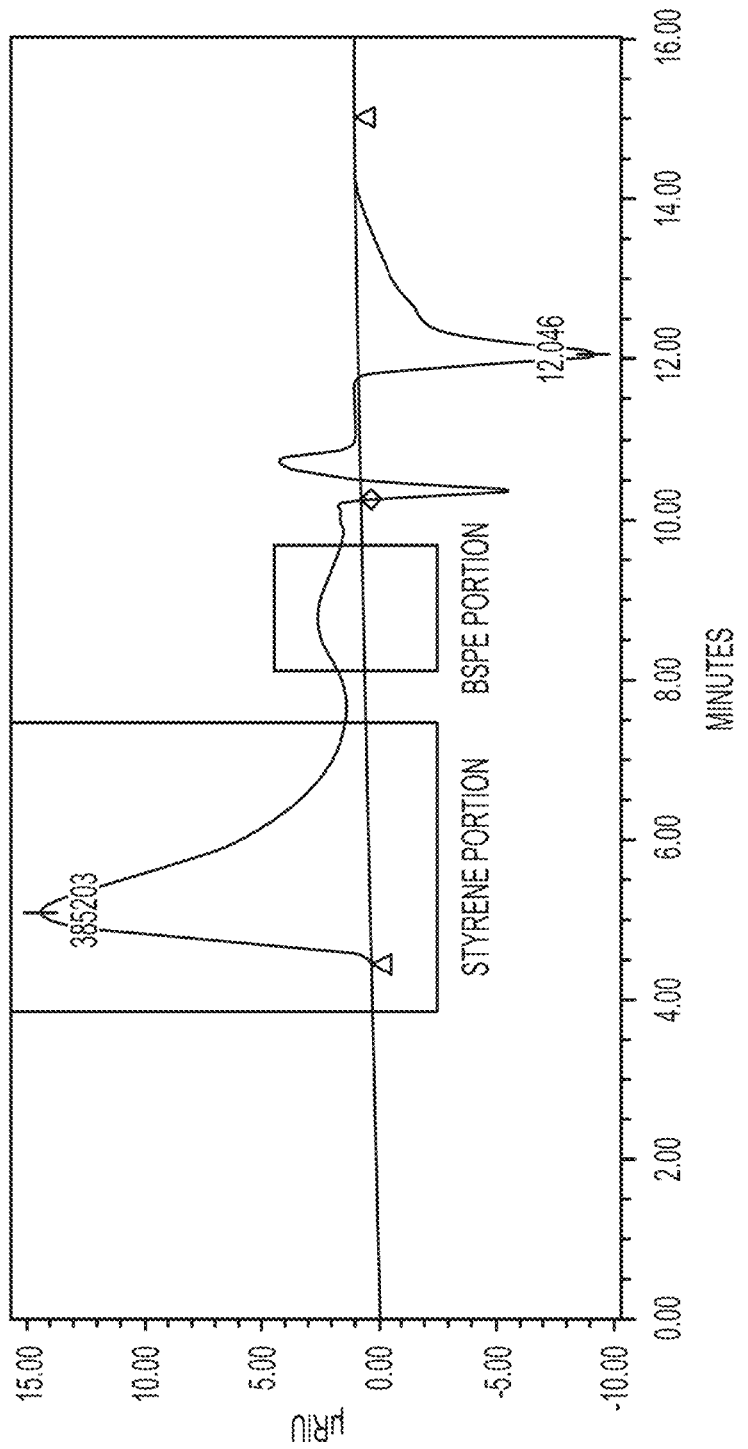
FIG. 3 shows a Gel Permeation Chromatography (GPC) chromatogram of an exemplary composite structure (Example 6) comprising a styrene-coated, sulfonated polyester-AgNP composite structure.

The GPC results in Table 2 show that each hybrid resin synthesized in the presence of silver has two weight average (Mw) peaks around 5000-6000 and 200,000-250,000 g/mol which correspond well to the BSPE and polystyrene resins as separate entities (see also FIG. 3).

The full GPC data of the hybrid/AgNP composite shows very high or broad polydispersity index (PDI) due to the high-molecular weight characteristic of the polystyrene and the low-molecular weight characteristic of the BSPE. When the GPC spectrum is spliced according to each type of polymer, the PDI is significantly lower since the polymers are treated as separate entities which are representative of their homopolymer composition. When Ex. 3, containing no AgNPs in hybrid composite, is compared to Ex. 4, Ex. 5 and Ex. 6 a sizable increase in the molecular weight of the polystyrene portion of the composite is observed. It has been indicated that the polymerization rate of acrylate and vinyl-type monomers in the presence of the silver nanoparticles may be attenuated, although a mechanism for such attenuation has not yet been elucidated. Yeum, J. H., et al. Macromol. Mater. Eng., 290:78-84 (2005).

Figure 4:
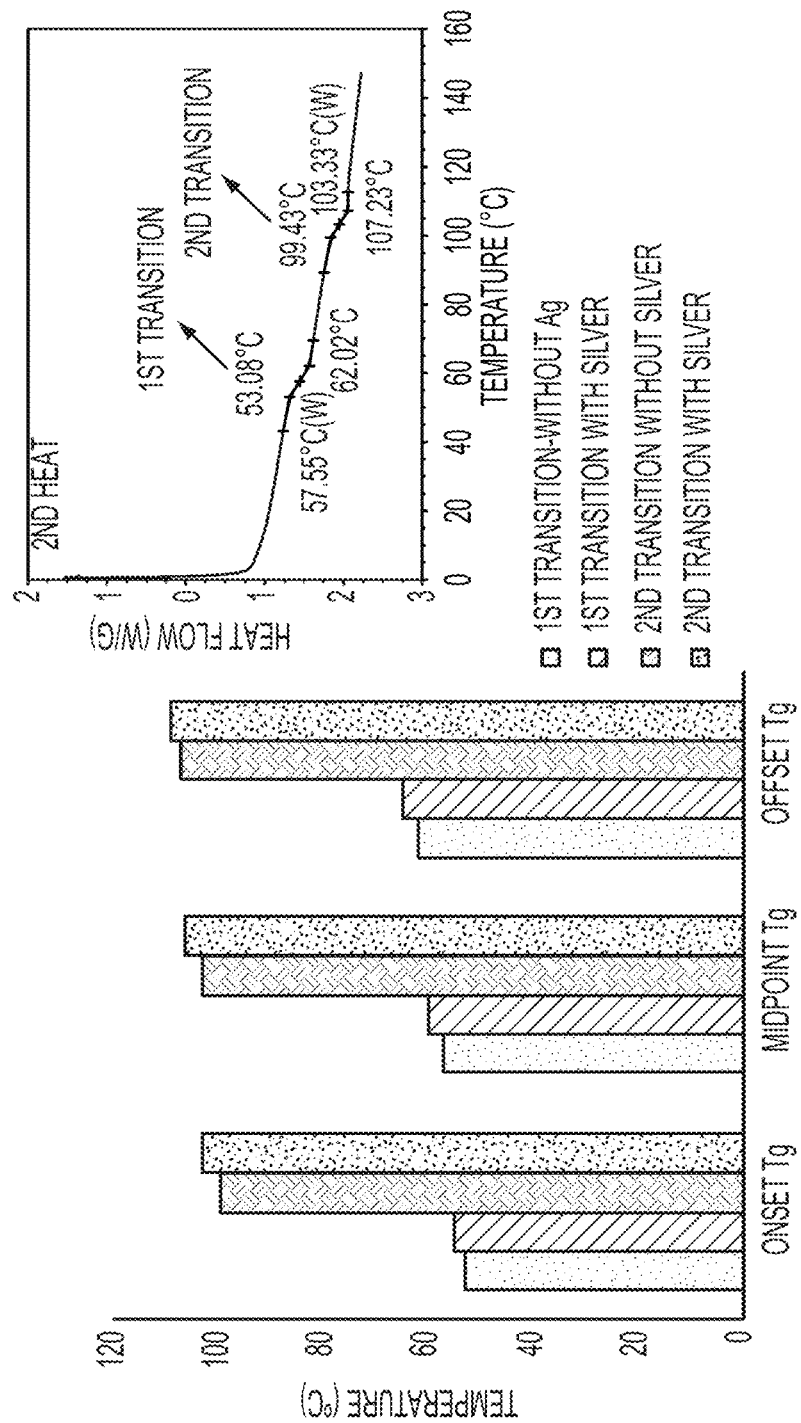
FIG. 4 shows a bar graph summarizing Differential Scanning calorimetry (DSC) results in the presence and absence of silver nanoparticles for exemplary styrene-coated sulfonated polyester composite structures.

Table 3. and FIG. 4. show that the styrenated BSPE/AgNPs have two distinct glass transition temperatures, with the BSPE being lower than the styrene phase. This may mean the nanoparticles are phase separated or result in microphase separation since they are very different in chemical properties (polarity, hydrophobicity). As well, the glass transitions are

TABLE 2

| Ex. | Reducing Agent | % Styrene relative to BSPE | Loading [$AgNO_3$] (w/w %) | Softening Pt (° C.) | GPC (full) | | | GPC (Styrene portion) | | | GPC (BSPE portion) | | |
|---|---|---|---|---|---|---|---|---|---|---|---|---|---|
| | | | | | Mw (×1000) | Mn (×1000) | PDI | Mw (×1000) | Mn (×1000) | PDI | Mw (×1000) | Mn (×1000) | PDI |
| 4 | None | 44 | 0.04% | >200 | 185.35 | 13.186 | 14.06 | 246.66 | 136.47 | 1.81 | 6.332 | 3.667 | 1.73 |
| 5 | oleic acid | 44 | 0.07% | >200 | 177.15 | 11.676 | 15.17 | 234.61 | 137.60 | 1.71 | 5.431 | 3.019 | 1.80 |
| 6 | glutathione | 53 | 0.04% | >200 | 164.03 | 11.300 | 14.52 | 215.36 | 124.76 | 1.73 | 5.652 | 3.348 | 1.69 |
| 2 | none | 0 | 0.00% | 124.5 | 4.226 | 1.759 | 2.40 | n/a | n/a | n/a | 4.226 | 1.759 | 2.40 |
| 3 | none | 44 | 0.00% | >200 | 543.74 | 321.81 | 1.69 | 526.74 | 315.27 | 1.67 | 5.281 | 3.479 | 1.52 |

The softening point (SP) is the temperature at which a pelletized form of dried polymer has flowed a certain distance under defined test conditions. Table 2 shows that all samples except the pure BSPE polymer have softening points greater than 200° C. which could most likely be due to slight narrow and quite distant from each other indicating a higher phase-separated morphology. In the present Examples, the hydrophilicity of the BSPE core is quite high compared to the polystyrene shell so the interfacial tension between the core and shell is high.

Table 3 shows Differential Scanning calorimetry (DSC) of nanocomposites; all have two transitions per scan except for BSPE sample (Ex. 2).

TABLE 3

| Ex. | Reducing Agent | % Styrene relative to BSPE | Loading [AgNO$_3$] (w/w %) | Tg (° C.) onset 1st transition | Tg (° C.) onset 2nd transition | Tg (° C.) midpoint 1st transition | Tg (° C.) midpoint 2nd transition | Tg (° C.) offset 1st transition | Tg (° C.) offset 2nd transition |
|---|---|---|---|---|---|---|---|---|---|
| 4 | none | 44 | 0.04% | 54.91 | 102.60 | 59.68 | 105.81 | 64.45 | 109.03 |
| 5 | oleic acid | 44 | 0.07% | 45.03 | 93.18 | 50.91 | 99.12 | 56.80 | 105.05 |
| 6 | glutathione | 53 | 0.04% | 47.96 | 90.25 | 53.42 | 97.61 | 58.87 | 104.46 |
| 2 | none | 0 | 0.00% | 55.09 | none | 59.31 | none | 63.52 | none |
| 3 | none | 44 | 0.00% | 53.08 | 99.43 | 57.55 | 103.33 | 62.02 | 107.23 |

FIG. 4 shows DSC results depicted in bar graph format to illustrate the effect of silver nanoparticles on $T_g$; vertical (BSPE portion) and horizontal (styrene portion) bars are samples without silver. Light gray and dark gray bars are samples containing silver. A slight increase in $T_g$ is observed even with such low loadings of AgNPs in the nanocomposites.

The samples with reducing agent (Ex. 5 and 6) tend to have depressed $T_g$s for both the 1st and 2nd transitions. This may be due to the reducing agent interacting with the polymers and causing them to swell without any chemical reaction involved thereby increasing the free volume. The polymers can slide past each other more easily and move around at lower temperatures than they would without the plasticizer (see Ex 5. versus Ex. 4).

Figure 5:
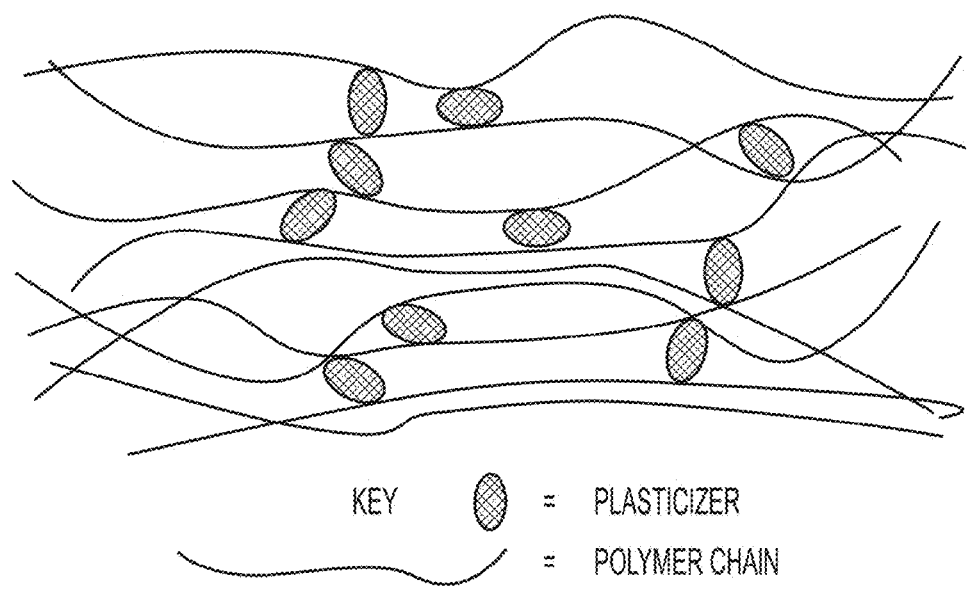
FIG. 5 shows a possible mechanism for the role of plasticizer in increasing polymer flexibility.

FIG. 5 shows how plasticizer increases polymers flexibility by getting between the polymer chains and keeping them further apart thereby reducing the forces of attraction between them and makes the material more flexible which is desirable in many applications. On the world-wide web at www.gcsescience.com/o59.htm.

Solvent Resistance Test

The solvent resistance test tests the ability of a polymer to resist chemicals or solvents that would otherwise degrade the polymer.

A pellet was made by compressing approximately 0.50 g of sample under 5 tons of pressure for 5 minutes using a hand press. The initial weight of the pellet was measured. 10 mL of solvent was added to the vials. After 24 hours, the solutions were inverted 5 times. After 48 hours, the pellet was placed on a weighing dish. The pellet was allowed to air dry. The final mass of the pellet was measured and recorded once it achieved constant weight (+/−0.0001 g).

BSPE alone cannot withstand treatment with solvents with a high dielectric constant/high polarity (i.e. methanol) very well. Although it was not completely dissolved after 48 hrs.; the physical properties changed dramatically to a stringy gelatinous blob.

Figure 2:
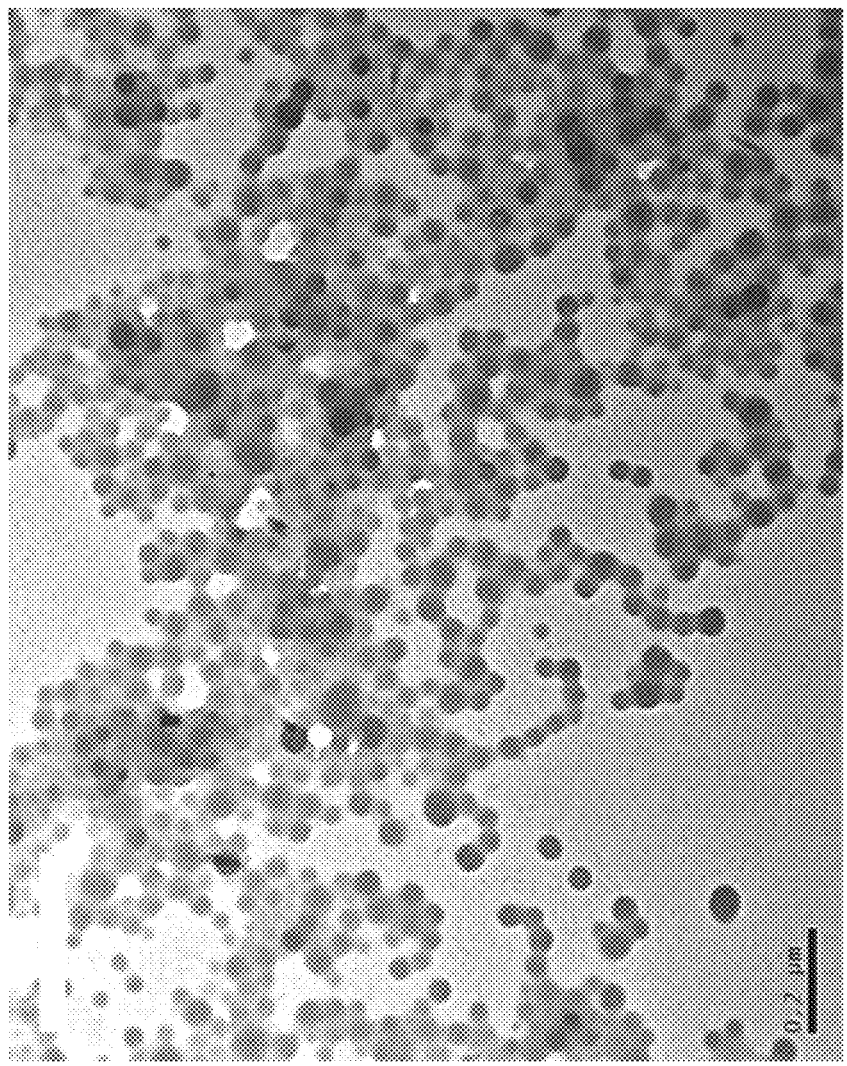
FIG. 2 shows a Transmission Electron Microscopy (TEM) image of an exemplary composite structure (Example 4) comprising a styrene-coated, sulfonated polyester-AgNP composite structure. Dark areas are AgNPs.

A pellet of pure poly(styrene) sample kept its form as a pellet and was almost completely undissolved. Example 4 had good resistance to methanol compared to other hybrid nanocomposites; this sample had well dispersed AgNPs within the organic matrix as seen in FIG. 2.

Overall, the styrenation of sulfonated polyester AgNPs improved its resistance to methanol. All the BSPE/Styrene AgNPs hybrids remained as distinct pellets in methanol with 85-90% of the pellet undissolved after 48 hrs. When less polar (low dielectric constant) solvents were used for the resistance test most of the samples dissolved.

Table 4 shows results of the solvent resistance results for BSPE/Styrenated AgNPs compared to 100% BSPE or polystyrene.

TABLE 4

| Vial | Example | Solvent | % Dissolved | Initial Appearance of Pellet | Final Appearance of Pellet |
|---|---|---|---|---|---|
| 1 | 3 | THF | 100.0% | white | completely dissolved |
| 2 | | MEK | 100.0% | white | completely dissolved |
| 3 | | methanol | 10.0% | white | White |
| 4 | 5 | THF | 100.0% | brown | completely dissolved |
| 5 | | MEK | 100.0% | brown | completely dissolved |
| 6 | | methanol | 11.5% | brown | brown, some cracking on the sides |
| 7 | 4 | THF | 100.0% | off white | completely dissolved |
| 8 | | MEK | 100.0% | off white | completely dissolved |
| 9 | | methanol | 7.0% | off white | white, some cracking on sides |
| 10 | 6 | THF | 100.0% | beige | completely dissolved |
| 11 | | MEK | 100.0% | beige | completely dissolved |
| 12 | | methanol | 12.0% | beige | Beige |
| 13 | Repeat of 2 | THF | 100.0% | white | completely dissolved |
| 14 | (BSPE only) | MEK | 100.0% | white | completely dissolved |
| 15 | | methanol | gelled | white | sticky/stringy white polymer, not a pellet |
| 16 | Polystyrene; | THF | 100.0% | white | completely dissolved |
| 17 | Sigma Aldrich | MEK | 100.0% | white | completely dissolved |
| 18 | Mw = 13K | methanol | 1.0% | white | white pellet |

Acid/Base Resistance

The acid/base resistance test tests the ability of a polymer acids and bases that would otherwise degrade the polymer.

A pellet was made by compressing approximately 0.50 g of sample under 5 tons of pressure for 5 minutes using a hand press. The initial weight of the pellet was measured. 10 mL of acid/base (10% Nitric acid, 10% NaOH or 30% Sulfuric acid) was added to the vials. After 96 hours, the pellet was placed on a weighing dish. The pellet was allowed to air dry for 3 days. The final mass of the pellet was measured and recorded. This procedure was adapted from an article published in Industrial and Engineering Chemistry. Church, J. M et al. Ind. Eng. Chem., 47 (12):2456-2462 (1955).

Table 5 shows Acid/Base Resistance results for BSPE/Styrenated AgNPs compared to 100% BSPE or polystyrene. The value for the % dissolved for sample from Example 3 was corrected to account for 5% sample loss during measurement.

TABLE 5

| Vial | Example | Acid/Base | % Dissolved | Initial Appearance of Pellet | Final Appearance of Pellet |
|---|---|---|---|---|---|
| 1 | 3 | 10% Nitric Acid | 0.0% | white | white |
| 2 | | 10% NaOH | 32.2% | white | white small pieces |
| 3 | | 30% Sulfuric Acid | 0.0% | white | white |
| 4 | 5 | 10% Nitric Acid | 4.3% | brown | brown |
| 5 | | 10% NaOH | 45.8% | brown | brown powder |
| 6 | | 30% Sulfuric Acid | 4.1% | brown | brown |
| 7 | 6 | 10% Nitric Acid | 5.4% | beige | beige |
| 8 | | 10% NaOH | 35.6% | beige | grey-brown powder |
| 9 | | 30% Sulfuric Acid | 14.5% | beige | beige |
| 10 | Repeat of 2 | 10% Nitric Acid | 2.0% | white | white |
| 11 | (BSPE only) | 10% NaOH | 63.0% | white | white small pieces |
| 12 | | 30% Sulfuric Acid | 0.00% | white | off white |
| 13 | Polystyrene; | 10% Nitric Acid | 0.0% | white | white |
| 14 | Sigma Aldrich | 10% NaOH | 0.0% | white | white |
| 15 | Mw = 13K | 30% Sulfuric Acid | 0.0% | white | white |

Figure 6:
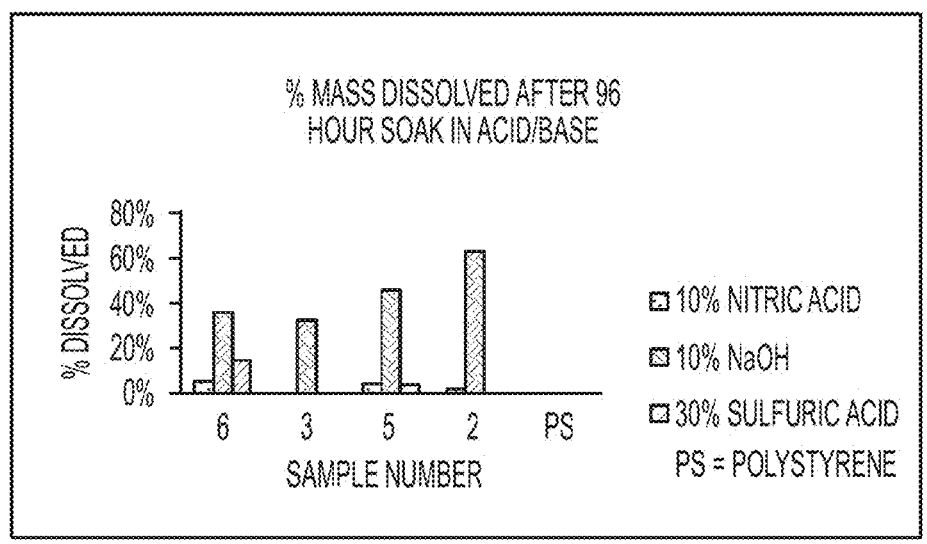
FIG. 6 shows a graph indicating the extent of dissolution for various composite structures and control samples subjected to acid or base conditions.

FIG. 6 shows the percent Total Mass of Pellet Dissolved After 96 Hour Soak in Acid/Base. The results of the soak test show that polyesters are largely susceptible to base catalyzed degradation. The sample of BSPE alone showed the highest amount of mass dissolved in 10% NaOH. In comparison, styrene alone did not dissolve. The BSPE-Styrene (Example 3) and BSPE-Styrene-Silver samples (Examples 5 and 6) were less susceptible to degradation in an alkaline environment than the sample that was not styrenated. Samples did not dissolve appreciably in acidic environments. The higher amount of dissolved material in acid for Example 6 is likely the result of the hydrolysis of glutathione in acid. Olson, C. K. et al. *J. Biol. Chem.*, 186:731-735 (1950).

FIG. 7 shows that the poly(styrene) control sample exhibits a one-step degradation in which almost complete decay is observed (weight loss is about 99.85-100% at the end of the process, i.e. at 600° C.). The BSPE control (Example 2) also exhibits a one-step degradation, with 2.206% residual weight percent as a result of the inorganic sulfonate groups. In comparison, the BSPE-Styrene-Ag hybrids have a two-step degradation. Since the temperatures at which BSPE decomposes overlaps somewhat with styrene, the two steps are not very distinct.

Thermal decomposition begins at approximately the same temperature when comparing the styrenated BSPE-Ag nanocomposite (Example 4) with the non-styrenated BSPE-Ag nanocomposite. However, between the temperatures of 300-400° C., the rate of thermal degradation of the styrenated BSPE-Ag hybrid is significantly lower than that of styrene alone, BSPE alone or the BSPE-Ag nanocomposite.

What is claimed is:

1. A composite structure comprising:
 a core particle comprising:
  a sulfonated polyester matrix; and
  a plurality of silver nanoparticles dispersed throughout the matrix; and
 a shell polymer disposed about the core particle.

2. The composite structure of claim 1, wherein the sulfonated polyester matrix is a branched polymer.

3. The composite structure of claim 1, wherein the sulfonated polyester matrix is a lithium, potassium, or sodium salt of a polymer selected from the group consisting of poly(1,2-propylene-5-sulfoisophthalate), poly(neopentylene-5-sulfoisophthalate), poly(diethylene-5-sulfoisophthalate), copoly-(1,2-propylene-5-sulfoisophthalate)-copoly-(1,2-propylene-terphthalate), copoly-(1,2-propylenediethylene-5-sulfoisophthalate)-copoly-(1,2-propylene-diethylene-terephthalatephthalate), copoly(ethylene-neopentylene-5-sulfoisophthalate)-copoly-(ethylene-neopentylene-terephthalatephthalate), and copoly(propoxylated bisphenol A)-copoly-(propoxylated bisphenol A-5-sulfoisophthalate).

4. The composite structure of claim 1, wherein the sulfonated polyester matrix comprises a polyol monomer unit selected from the group consisting of trimethylolpropane, 1,2-propanediol, diethylene glycol, and combinations thereof.

5. The composite structure of claim 1, wherein the sulfonated polyester matrix comprises a diacid monomer unit selected from the group consisting of terephthalic acid, sulfonated isophthalic acid, and combinations thereof.

6. The composite structure of claim 1, wherein the core particle has a particle size in a range from about 5 nm to about 500 nm.

7. The composite structure of claim 1, wherein a loading of silver is present in the composite is in a range from about 100 ppm to about 10,000 ppm.

8. The composite structure of claim 1, wherein the silver nanoparticles have a particle size in a range from about 2 to about 50 nm.

9. The composite structure of claim 1, wherein the shell polymer comprises a styrene monomer.

10. The composite structure of claim 9, wherein the shell polymer further comprises at least one vinyl monomer selected from the group consisting of methyl acrylate, ethyl acrylate, butyl acrylate, isobutyl acrylate, dodecyl acrylate, n-octyl acrylate, 2-ethylhexyl acrylate, 2-chloroethyl acrylate, phenyl acrylate, β-carboxyethyl acrylate, methyl α-chloro acrylate, methyl methacrylate, ethyl methacrylate, butyl methacrylate, butadiene, isoprene, methacrylonitrile, acrylonitrile, methyl vinyl ether, vinyl isobutyl ether, vinyl ethyl ether, vinyl acetate, vinyl propionate, vinyl benzoate, vinyl butyrate, vinyl methyl ketone, vinyl hexyl ketone, and methyl isopropenyl ketone, vinylidene chloride, vinylidene chloro fluoride, N-vinylindole, N-vinyl pyrrolidene, acrylic acid, methacrylic acid, acrylamide, methacrylamide, vinyl pyridine, vinyl pyrrolidone, vinyl N-methylpyridinium chloride, vinyl naphthalene, p-chlorostyrene, vinyl chloride, vinyl fluoride, ethylene, propylene, butylene, and isobutylene.

11. The composite structure of claim 1, wherein the shell polymer has a thickness from about 0.5 nm to about 100 nm.

12. The composite structure of claim 1, wherein shell polymer confers to the core particle one or more properties selected from the group consisting of (a) methanol resistance, (b) resistance to thermal degradation, and (c) acid/base resistance.

13. An article comprising a plurality of composite structures comprising:
  a core particle comprising:
    a sulfonated polyester matrix; and
    a plurality of silver nanoparticles dispersed throughout the matrix; and
  a shell polymer disposed about the core particle.

14. A method comprising:
  heating a sulfonated polyester resin in an organic-free solvent;
  adding a solution of silver (I) ion to the heated resin in water to form a mixture;
  forming of an emulsion of core particles comprising a sulfonated polyester matrix and a plurality of silver nanoparticles disposed within the sulfonated polyester matrix; and
  adding a styrene monomer and initiator to the emulsion of composite particles to form a shell polymer disposed about the core particles, thereby forming a composite structure.

15. The method of claim 14, wherein forming the emulsion comprises continued heating after adding the solution of silver (I) ion to the heated resin in water.

16. The method of claim 15, wherein the reducing agent is selected from ascorbic acid, trisodium citrate.

17. The method of claim 14, wherein forming the emulsion comprises adding a reducing agent after adding the solution of silver (I) ion to the heated resin in water.

18. The method of claim 14, wherein heating is conducted at a temperature from about 65° C. to about 90° C.

19. The method of claim 14, wherein a source of silver (I) ion is selected from silver nitrate, silver sulfonate, silver fluoride, silver perchlorate, silver lactate, silver tetrafluoroborate, silver oxide and silver acetate.

20. The method of claim 14, wherein during adding styrene monomer, also adding at least one vinyl monomer selected from the group consisting of methyl acrylate, ethyl acrylate, butyl acrylate, isobutyl acrylate, dodecyl acrylate, n-octyl acrylate, 2-ethylhexyl acrylate, 2-chloroethyl acrylate, phenyl acrylate, β-carboxyethyl acrylate, methyl α-chloro acrylate, methyl methacrylate, ethyl methacrylate, butyl methacrylate, butadiene, isoprene, methacrylonitrile, acrylonitrile, methyl vinyl ether, vinyl isobutyl ether, vinyl ethyl ether, vinyl acetate, vinyl propionate, vinyl benzoate, vinyl butyrate, vinyl methyl ketone, vinyl hexyl ketone, and methyl isopropenyl ketone, vinylidene chloride, vinylidene chloro fluoride, N-vinylindole, N-vinyl pyrrolidene, acrylic acid, methacrylic acid, acrylamide, methacrylamide, vinyl pyridine, vinyl pyrrolidone, vinyl N-methylpyridinium chloride, vinyl naphthalene, p-chlorostyrene, vinyl chloride, vinyl fluoride, ethylene, propylene, butylene, and isobutylene.

* * * * *